United States Patent Office 2,894,922
Patented July 14, 1959

2,894,922

FATTY ACID ESTERS MODIFIED BY ETHYLENICALLY UNSATURATED SILANE COMPOUNDS

Melvin M. Olson, Milwaukee, and Roger M. Christenson, Whitefish Bay, Wis., assignors to Pittsburgh Plate Glass Company, a corporation of Pennsylvania No Drawing. Application July 13, 1954
Serial No. 443,134

4 Claims. (Cl. 260—18)

This invention relates to derivatives of ethylenically unsaturated compounds of silicon and esters of drying oil acids and it has particular relation to an interpolymer of a hydrolyzable vinyl derivative of a silane and an ester of a drying oil acid containing a plurality of double bonds and being capable of interpolymerization by addition with the double bonds of the ethylenic group in the silicon derivative.

In common coating materials such as paints, varnishes and enamels, esters of various higher fatty acids containing a plurality of ethylenic groups in the hydrocarbon chains are employed as vehicles for film forming agents. These, by reason of the reactivity of the ethylenic groups are capable of linking together to provide macromolecules and thus to convert the films into solid resistant state. The most common source of fatty acids, of course, comprises the drying and semi-drying oils such as linseed oil, soya oil, tung oil, safflower oil, oiticica oil, perilla oil, menhaden oil, and the like. These, either in the raw or bodied state, have long been used in the preparation of protective and/or decorative films. These oils, or acids obtained therefrom, have also been extensively used as modifiers of alkyd resins and when so employed, the ethylenic groups therein have imported added degrees of functionality to the resins, improved solubility and compatibility and otherwise improved their properties.

While the esters of higher ethylenically unsaturated fatty acids have proven to be very valuable and relatively inexpensive coating agents, their properties are not in all respects completely satisfactory in some applications. For example, their hardness and their resistance to marring frequently leaves something to be desired. Their resistance to acids, alkalis and other chemicals, as well as resistance to weathering, are not sufficiently great for complete satisfaction in all applications.

Still another important class of materials which have heretofore been suggested for use as coating agents comprises the esters and the organo derivatives of silicon compounds such as the siloxanes and polysiloxanes derived by hydrolysis of a silane. Many of these when spread and appropriately baked, provide very hard, mar resistant, chemically resistant, and heat resistant films; however, these materials are expensive and sometime have other objectionable properties, as for instance, brittleness and a tendency to cure slowly.

This invention comprises the preparation of valuable coating materials embodying (A) esters of fatty acids of drying glyceride oils or semi-drying glyceride oils (B) with vinylic derivatives of silicon in a single material. In order to obtain such materials, esters of a fatty acid such as drying, or semi-drying glyceride oil acids, and being represented by the glyceride oils per se or alkyd resins modified by such oils or oil acids, or esters of such acids, and monohydric alcohols such as the vinyl or allyl alcohols may be interpolymerized with a silicon compound containing one or more vinyl groups. The resultant products are less expensive than the usual organic compounds of silicon and they have valuable drying properties when baked, similar to the esters of the fatty drying oil acids and in consequence, are cured more readily than most siloxanes; but they form films which are often harder and more chemically resistant and more heat resistant and more mar resistant than films of esters of drying oil acids which do not contain a siloxane component.

Acids suitable for use in the practice of the present invention comprise those from linseed oil, soya oil, oiticica oil, tung oil, safflower oil, perilla oil, and many others commonly used in the paint and varnish industries.

It will be recognized that the hydrocarbon portions of the fatty acids of oils of the drying and semi-drying types include diene groups such as

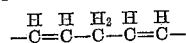

and

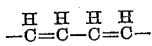

and in some instances these groups are tautomeric with respect to each other. These groups can react by addition with vinylic or allyl silanes in accordance with the equations:

(a)
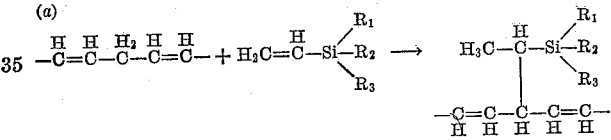

(b)
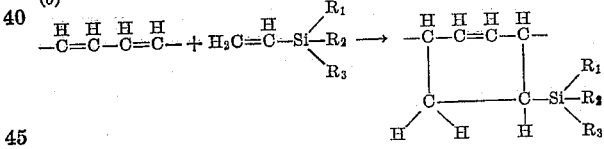

The groups $R_1$, $R_2$, and $R_3$ include at least two hydrolyzable radicals such as halogen, alkoxy, aryloxy or the like. Equation (a) represents addition. The free valence on the second carbon atom of the diene group may be attached to a carbon in a contiguous silane radical to produce a chain; it might also be attached to a carbon in the same fatty acid group to provide a cyclic compound. In a glyceride, or an ester of another polyhydric alcohol, the free valence might attach itself to a contiguous fatty acid radical.

Equation (b) is representative of an acid group containing a pair of conjugated double bonds, or a pair of double bonds that undergo isomerization under reaction conditions to provide conjugation. This reaction is of the Diels-Alder type. The resultant Diels-Alder type adduct contains no Si—O—C linkages and thus would be more stable both thermally and chemically than the conventional silicon modified alkyd resins. Cross-linking in the hydrolyzed adduct would result from formation of siloxane linkages, which are known to be very stable both to heat and hydrolytic reactions.

In many instances, the fatty acid esters suitable for interpolymerization with the ethylenically unsaturated silicon compound in accordance with this invention may be derived by simple esterification reaction between a fatty acid and an appropriate alcohol, either ethylenically unsaturated or saturated as may be desired. Vinyl esters of the drying oil acids may readily and cheaply be formed by reaction of the fatty acid with acetylene in the presence of a zinc or cadmium soap as a catalyst. They may also be formed by interchange reaction of the fatty acid with vinyl acetate or with other esters of lower fatty acids and alcohols such as vinyl alcohol or the like.

In the drying and semi-drying oils, radicals of a number of fatty acids, including those with a plurality of double bonds, as well as those with single double bonds, or even with no double bonds, occur as mixtures; normally acids of these mixtures will be used for esterification in accordance with the provisions of this invention to interpolymerize with ethylenically unsaturated silanes to provide valuable products. However, it is also possible to obtain the fatty acids in concentrated form by distillation of mixtures of the free acids or by other methods. Thus, in this manner, it is possible to obtain mixtures enriched in linolenic acid, linoleic acid, clupanodonic acid, elaeostearic acid, and others which can be esterified with various alcohols to provide an appropriate starting material in the manufacture of the interpolymers of the present invention.

Fatty acids of glyceride drying oils may be esterified with various alcohols to provide starting esters. In the oils per se, glycerin of course constitutes the alcoholic component; the glycerides may be used for interpolymerization with the vinylic silanes. However, in the various synthetic esters contemplated in this invention glycerin may also be replaced by monohydric alcohols such as methyl, ethyl, propyl, butyl or amyl, or polyhydric alcohols such as ethylene glycol, diethylene glycol, propylene glycol; or polyhydric alcohols such as mannitol, sorbitol, pentaerythritol, polyvinyl alcohol, and others.

The alkenyl derivatives of silanes suitable for interpolymerization with the fatty acid esters previously described, constitute a relative large class. In general they will include a vinyl or allyl group attached by carbon-silicon linkages to the radical

wherein at least two groups $R_1$, $R_2$ and $R_3$ are hydrolyzable and being represented by halogens such as chlorine or bromine, or alkoxy, aryloxy, acyloxy, etc. One of the groups $R_1$, $R_2$ and $R_3$ may be, but is not necessarily, non-hydrolyzable as for instance alkyl or aryl. $R_1$, $R_2$ and $R_3$ may comprise mixtures of a plurality of the foregoing radicals. Alkenylalkoxysilanes or alkenylaryloxysilanes constitute one group of such compounds which include vinyl- or allyltrimethoxysilane, vinyl- or allyltriethoxysilane, vinyl- or allyltripropoxysilane, vinyl- or allyltributoxysilane, vinyl- or allyltriamyloxysilane, vinyl- or allyltriphenoxysilane, and others containing a vinyl or allyl, methallyl, or similar group having a terminal $>C=CH_2$ group and being attached to a silicon in the silane compound through carbon-silicon linkage. This type of compound may be designated as vinyl- or allyl-organooxysilanes, where the term organooxy designates an alkyl or aryl group (or a halogen or like derivative of an alkyl or aryl group) here said group is linked to silicon through oxygen. The unsaturated group must be capable of undergoing a Diels-Alder reaction or adding a methylene group.

Still another group of vinyl or allyl silanes which are hydrolyzable and may be used in the practice of the invention includes vinyltrihalosilanes, such as vinyltrichloro, or vinyltribromo silanes. Mixed vinyl or allyl compounds containing both alkoxy and halogen compounds and being represented by vinyldiethoxychlorosilane and vinyldibutoxychlorosilane are also included. Likewise, mixtures of vinylalkoxy- and vinylhalosilanes such as mixtures of vinyltributoxy and vinyltrichlorosilane may be employed.

In order to interpolymerize one of the foregoing vinylsilanes or allylsilanes with an ester of an acid of a glyceride drying oil, a mixture of the two components, with or without a catalyst such as benzoyl peroxide, is introduced into an appropriate reaction vessel and heated, preferably with agitation and in the absence, or substantial absence of oxygen at an appropriate temperature such as about 240° C. to 350° C. until the desired viscosity is attained. The fatty acid esters may comprise, for example, from about 25 to about 80 percent by weight of the ester-silane mixture. The reaction may be conducted with the vinylsilane compound in excess of stoichiometric ratio and at the conclusion of the reaction, the excess may be removed by distillation, preferably under a reduced pressure, or subsequently it may be cohydrolyzed.

In the reaction of interpolymerization between the ester of the glyceride drying oil fatty acids and the vinylsilane compound, it will be appreciated that at least a portion of the fatty acid radicals contain reactive ethylenic groups and these may react by addition with the vinyl or allyl groups of the silane compound, in accordance with the equations already given. This naturally constitutes the main channel of reaction in those instances where the alcohol component of the fatty acid ester is saturated. Thus for example, if glyceride oil is employed, reaction presumably takes place between the ethylenic groups of the fatty acids and the vinylsilane. However, if a vinyl or an allyl ester of fatty acids is employed, the ethylenic groups in the alcohol component are retained in the ester and are susceptible of reaction by addition with the ethylenic group of the silane compound. Doubtless mixed reactions in which ethylenic groups in the vinyl or allyl alcohol radicals and also those in the fatty acid radicals are involved, may occur. Probably some of the esters of saturated fatty acids such as stearic acid and allyl or vinyl alcohols may enter into addition interpolymerizations with vinyl or allyl silanes such as vinyltributoxysilane to form interpolymers.

At the conclusion of the addition reaction, and after the excess vinyl or allyl silane component has been distilled, the residue comprising the addition product may be hydrolyzed with an aqueous medium, such as a mixture of water and a lower water soluble alcohol, e.g. ethyl or propyl or butyl alcohol, to provide siloxane

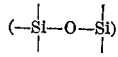

linkages or perhaps

groups which dehydrate at a later stage to provide siloxane linkages. The siloxane linkages produce a cross-linking effect between a plurality of adduct molecules thus increasing the chemical inertia and insolubility of the ultimate product.

Solvents of one or all components of the reaction system, for example, ketones, alcohols, ethers and the like may be included. Catalysts of hydrolysis such as mineral acids, hydrochloric acid, sulfuric acid, and others in amounts from minute traces up to about 10 percent by weight of the aqueous medium may be included, but are not required.

The reactions of hydrolysis may be made conjoint by inclusion with the addition product, alkoxy, aryloxy, or chloro alkyl silanes containing a suitable number of hydrolyzable groups, to form chains of desired length.

Surfaces may be suitably coated by various techniques of brushing, roller coating, or spraying (in the presence of a diluent of the addition product as may be required). For example, silanes such as vinyltrichlorosilane or diethyl- or dimethyldichlorosilanes, may be added and the mixtures may be hydrolyzed to form mixed polysiloxanes which are adapted to be cured by heat. Coatings of these polysiloxanes when applied to surfaces of metal, stone, brick or the like, can be cured by heating to a hard, chemically resistant state.

The preparation of typical esters of monohydric alcohols and ethylenically unsaturated acids of a glyceride oil is illustrated by the following preliminary examples.

EXAMPLE A

This example is illustrative of the preparation of butyl esters of a fraction of distilled fatty acids of a glyceride oil, said acids being of an iodine value of at least 132, an acid value of 197 to 205 and being sold commercially as NeoFat 3. The apparatus employed in conducting the reaction comprised a two liter flask equipped with a reflux condenser and an azeotropic separator for removing water of reaction, a stirrer, a thermometer and suitable means for heating the contents. In the reaction, lead oxide (PbO) was employed as an esterification catalyst. Benzene was employed as a non-reactive azeotropic distillation medium. The reaction charge comprised:

Fatty acids _____ 840 grams (3 moles).
Butanol _____ 444 grams (6 moles).
Lead oxide _____ 1 gram.
Benzene _____ 100 milliliters.

The foregoing charge was introduced into the flask and was heated to effect azeotropic distillation of a benzene-water mixture with elimination of the water. The reaction was continued until 54 milliliters of water had been separated.

The flask was then connected to a source of vacuum and the mixture was subjected to distillation at a pressure of about 0.25 millimeter of mercury (absolute) until a boiling point of 151° C. at the foregoing temperature had been obtained.

A residue weighing 946.7 grams was obtained which was essentially the butyl esters of the foregoing fatty acids. These esters were well adapted for reacting with ethylenically unsaturated silane compounds containing hydrolyzable groups. The esters when so reacted, gave valuable interpolymers and these when hydrolyzed, were valuable coating media.

The techniques of Example A could be employed to prepare esters of the foregoing distilled fatty acids, or other fatty acids of glyceride drying oils or semi-drying oils and other alcohols, ethylenic or non-ethylenic as may be desired.

The application of the principles of the invention in the preparation of valuable coating media from fatty acid esters in accordance with the provisions of this invention are illustrated by the following examples:

Example I

The charge employed comprised:

| | Grams |
|---|---|
| Allyl esters of safflower fatty acids | 237 |
| Vinyltributoxysilane | 201 |

These components were mixed and placed in a liter flask having three necks and being equipped with a stirrer which was appropriately sealed in one of said necks. The flask was also equipped with an inlet for nitrogen gas, a thermometer and a flux condenser. The system was flushed out with nitrogen gas and was heated while being stirred. A slight refluxing action occurred at a pot temperature of 240° C. and when this subsided, the temperature of the pot was adjusted to a range of 250° C. to 260° C., and was so held for a period of 26 hours and 10 minutes. The temperature was then slightly lowered and was maintained for 16 additional hours. At the conclusion of this time a sample of the reaction mixture when cooled to room temperature, had a Gardner viscosity of A. The temperature of the mixture was maintained at 245° C. for 2½ additional hours, after which it was raised over a period of 30 minutes to 300° C. and was maintained in the range of 295° C. to 300° C. for 5 hours. At this time, a test indicated a viscosity of H to I on the Gardner scale. The reaction mixture was then allowed to cool to room temperature and to stand overnight. The next morning, the viscosity was in the range of I to J, the color was in the range of 3 to 4 on the Gardner scale and the index of refraction at 25° C. was 1.4673. In order to remove the excess of vinyltributoxysilane, the mixture was heated at 175° C. and agitated under an absolute pressure of 5 millimeters of mercury for 2½ hours; only a small amount of unreacted compound being thus distilled. The residue constituting 408 grams, was an interpolymer of the vinyltributoxysilane and the allyl esters of safflower fatty acids of a viscosity of J and an index of refraction of 1.4671 at 25° C. The interpolymers, thus prepared, could be mixed with an aqueous medium such as water, or preferably with water and an alcohol such as butyl alcohol, and hydrolyzed to provide polysiloxane derivatives of the allyl esters of the safflower fatty acids. The polysiloxane derivatives could be employed for coating the surfaces of steel and other materials. Films of such material could be baked in order to provide protection and/or decoration.

Example II

In accordance with the provisions of this example, substitute vinyl esters of safflower fatty acids for the corresponding allyl esters and proceed in other respects as in Example I. Useful materials soluble in various solvents and being adapted to be hydrolyzed with water to provide polysiloxane derivatives of safflower esters result.

Example III

For the allyl esters of safflower fatty acids in Example I, substitute a stoichiometric amount of safflower oil and proceed as in the foregoing example to provide interpolymers of the oil and vinyltributoxysilane. The interpolymer can then be hydrolyzed in an aqueous medium to the corresponding polysiloxane derivative which can be applied as a coating and baked to a hard, cured state.

In order to effect hydrolysis, the adduct of the esters of the safflower fatty acids and the vinyltributoxysilane may be dissolved in an appropriate medium such as toluene or xylene and agitated with an aqueous medium such as water and ethyl or butyl alcohol, at room temperature. The mixture separates into two layers, one of which contains the hydrolyzed fatty acid ester-vinylsiloxane derivative. The latter is then washed with water in order to remove all water-soluble components such as acids or free alcohols. Alcohols of low water-solubility are removed by distillation.

Example IV

In accordance with this example, vinyltributoxysilane was reacted in molecular equivalency with a methyl ester of linseed oil fatty acids to provide an interpolymer product as described in Example I. This interpolymer comprised methyl linseedate esters in a proportion of 58.4 parts by weight and 54.8 parts by weight of the vinyltributoxysilane. The adduct of vinyl tributoxysilane and methyl linseed oil acid esters was then further mixed in toluene with 42.4 parts of phenyltrichlorosilane and 15.7 parts of diethyldichlorosilane to provide a composition which was hydrolyzed with a mixture of water and butyl alcohol at room temperature. The layers which were formed were separated and the hydrolyzed product was washed with water to free it of soluble components.

The organic layer was concentrated by distillation to give a solution of a resin having the following composition:

| | Percent by weight |
|---|---|
| $CH_2=CHSiO_{1.5}$ | 14.3 |
| $C_6H_5$—$SiO_{1.5}$ | 23.4 |
| $(C_2H_5)_2$—$SiO$ | 9.4 |
| Methyl linseedate | 52.9 |

This material was soluble in toluene and other media and when diluted in toluene to a consistency of 73.6 percent by weight of solids had a viscosity of A on the Gardner scale and a color of 7–8.

The material was spread upon panels of steel and was baked for ¾ hour at 375° F. to a hard, acid and alkali resistant film of good mar resistance.

Example V

In this example, the esters of fatty acids comprised the allyl esters of soya acids. The vinyl compound of silicon comprised vinyltriethoxysilane. These two were combined to provide a mixture comprising allyl soyate (30.1 parts by weight) and vinyltriethoxysilane (17.9 parts by weight). The mixture was interpolymerized by heating in a bomb at 275° C. for 15 hours. Unreacted vinyltriethoxysilane was removed under a vacuum of about 10 millimeters of mercury (absolute) at a temperature of 100° C. The resultant interpolymer was then mixed with 18 grams of phenyltrichlorosilane, 6.7 grams of diethyldichlorosilane, and 50 millimeters of toluene and hydrolyzed with water and butyl alcohol at room temperature in the well known manner. The product of cohydrolysis was washed to free it of soluble components. The butanol and remaining water were removed by distillation. A product was obtained of the composition:

| | Percent by weight |
|---|---|
| $CH_2=CHSiO_{1.5}$ | 12.5 |
| $C_6H_5SiO_{1.5}$ | 21.0 |
| $(C_2H_5)_2$—$SiO$ | 8.5 |
| Allyl soyate | 58.0 |

The product which had a solids content of 77 percent by weight in xylene, was of a viscosity of B+ and a color of 6 on the Gardner scale. Steel panels were coated with the composition and were baked for 45 minutes at 400° F. The resultant films were hard and mar resistant. They were of good flexibility. They possessed high resistance to acid and alkali.

Example VI

The fatty acid ester in this instance comprised tung oil (a natural glyceride) and the vinyl silane compound was vinyltrichlorosilane. An interpolymer was formed by placing 13.7 grams of the oil and 8 grams of the silane in a bomb which was heated for 1 hour at 150° C. to 180° C. At the conclusion of the reaction in the bomb, the excess of vinyltrichlorosilane was distilled off under vacuum.

The residue from distillation was hydrolyzed in water and butyl alcohol to provide a product which when spread upon a panel of steel, air dried to provide a solid, though somewhat cloudy coating.

Example VII

Butyl esters of fatty acids prepared in accordance with the provisions of Example A were interpolymerized with the vinyltributoxysilane to provide a useful interpolymer. The reaction mixture comprised: butyl esters of the above fatty acids, 643 grams (1.91 moles), vinyl tributoxysilane, 525 grams (1.91 moles). These were introduced into a flask which was heated to a temperature of 208° C., at which point, evolution of distillate was initiated and continued for 6 hours 30 minutes at which time a temperature of 300° C. had been obtained. The reaction was discontinued overnight, and was resumed the following morning and was continued for 7 hours, 10 minutes; whereupon, it was again discontinued and resumed the next day and was continued for 5 hours and 10 minutes. The time-temperature log of the reaction is tabulated as follows:

| Time | | Temperature, °C. | Remarks |
|---|---|---|---|
| Hours | Minutes | | |
| 0 | 0 | 208 | Distillate was removed as formed. |
| 1 | 0 | 225 | |
| 2 | 0 | 250 | |
| 3 | 0 | 265 | |
| 3 | 30 | 272 | |
| 4 | 20 | 283 | |
| 4 | 45 | 305 | |
| 6 | 30 | 300 | |
| (*) | (*) | (*) | |
| 6 | 30 | 170 | |
| 7 | 10 | 236 | |
| 8 | 0 | 265 | |
| 8 | 10 | 270 | |
| 8 | 55 | 286 | |
| 9 | 10 | 308 | |
| 10 | 55 | 295 | Some distillate was removed. |
| 11 | 0 | 300 | |
| (*) | (*) | (*) | |
| 13 | 30 | 295 | |
| 13 | 30 | 290 | Some distillate was removed. |
| 14 | 45 | 305 | |
| 17 | 5 | 290 | |
| 18 | 0 | 300 | |
| 19 | 0 | 300 | |

*At this point, the mixture was allowed to stand over night. Reaction was resumed the next day.)

The residue as thus obtained weighed 1040.3 grams and consisted primarily of the desired interpolymer with some unreacted vinyltributoxysilane. The reaction flask was connected to a vacuum line and the product was subjected to distillation; whereupon a fraction boiling within a range of 121° C. at .3 millimeter of mercury to 162° C. at .34 millimeter of mercury and with a pot temperature of 162° C. to 184° C. was obtained. The residue constituting the desired product, weighed 946 grams and contained about 440 grams of combined vinyltributoxysilane. Therefore, the yield of ester was 84.2 percent.

The residue constituting the desired interpolymer of butyl esters of linseed oil fatty acids and vinyltributoxysilane was mixed with phenyltrichlorosilane and dimethyldimethoxysilane and the mixture was cohydrolyzed with a mixture of water and butanol to provide a soluble polysiloxane interpolymer.

The cohydroylzable mixture was of the following composition:

Interpolymer of butyl esters of fatty acids and vinyltributoxysilane _____ 880 grams (1.49 gram-atoms Si).
Phenyltrichlorosilane _____ 315 grams (1.49 moles).
Dimethyldiethoxysilane _____ 111 grams (0.75 mole).

The foregoing were mixed with 600 milliliters of xylene and this mixture was added dropwise and with vigorous agitation to 1000 milliliters of butanol and 1500 milliliters of water, and 400 milliliters of xylene. The reaction mixture was kept at a temperature of 38° C. or below in accordance with the following time-temperature log.

| Time | | Temperature (° C.) |
|---|---|---|
| Hours | Minutes | |
| 0 | 0 | 25 |
| 1 | 0 | 38 |
| 1 | 55 | 37 |
| 3 | 10 | 38 |

At the end of the time indicated in the log, addition of the solution of hydroylzable components was complete and the mixture was then stirred for two hours and twenty minutes, after which, it separated into an organic layer and an aqueous layer. The organic layer was drawn off and was washed once with water and left to stand overnight. The next day, it was washed until evolved hydrochloric acid was removed and a neutral product was obtained. The product was then stripped on a steam bath under vacuum accompanied by agitation. The final pot temperature was 96° C. and the vacuum employed in the stripping operation was carried to less than 5 millimeters of mercury (absolute). The product (residue) was treated with a filter aid known as Celite and was filtered.

A yield of 1051 grams of a soluble polysiloxane product comprising the hydrolysis product of the interpolymer of the butyl esters of the fatty acids and the vinyltributoxysilane with phenyltrichlorosilane and dimethyldiethoxysilane resulted. This product could be dissolved in solvents such as toluol, xylene, methylethylketone and others. It could be applied as a coating to sheets of iron or steel, and to various other materials. The films could be baked to a hard, chemically resistant and relatively mar resistant state.

It will be apparent to those skilled in the art that the embodiments of the invention herein disclosed are by way of example or illustration and that numerous modifications may be made therein without departure from the spirit of the invention or the scope of the appended claims.

We claim:

1. A method of forming a coating material, which comprises the steps of agitating and heating to a temperature in a range of about 150° C. to about 350° C. in the substantial absence of oxygen a mixture containing as the sole reactive ingredients about 25 to 80 percent of an ester of a drying oil acid and an aliphatic alcohol, and a hydrolyzable compound of the class consisting of vinyl trihalosilane and vinyl trialkoxy silane, thereby obtaining an unhydrolyzed addition interpolymer of the two and then hydrolyzing the interpolymer to obtain a polysiloxane which is soluble in xylene and toluene and is adapted when spread as a film and heated, to cure to a hard durable state.

2. A method of forming a coating material which comprises the steps of agitating in the substantial absence of oxygen and concurrently heating to a temperature of about 150° C. a mixture containing as the sole reactive ingredients about 25 to 80 percent of an ester of a drying oil acid and an alcohol of the class consisting of vinyl alcohol, allyl alcohol, methyl alcohol, ethyl alcohol, propyl alcohol, butyl alcohol, amyl alcohol, ethylene glycol, diethylene glycol, mannitol, sorbitol, pentaerythritol, and polyvinyl alcohol and a hydrolyzable compound of the class consisting of vinyltrialkoxysilanes and vinyltrihalosilanes, thereby obtaining an unhydrolyzed addition interpolymer of the two and then hydrolyzing the interpolymer to obtain a polysiloxane which is soluble in xylene and toluene and is adapted when spread as a film and heated, to form a hard, durable coating.

3. A method of forming a coating material which comprises the steps of agitating in the substantial absence of oxygen and concurrently heating to a temperature of about 150° C. to about 350° C. a mixture containing as the sole reactive ingredients about 25 to 80 percent of an ester of a drying oil acid and an aliphatic alcohol and a compound of a class consisting of vinyltrialkoxysilanes and vinyltrihalosilanes, thereby obtaining an unhydrolyzed addition interpolymer of the two, mixing said addition interpolymer with phenyltrichlorosilane and adding water to the mixture, thereby hydrolyzing the mixture and providing said coating material.

4. An interpolymer product obtained by the method as defined in claim 1.

References Cited in the file of this patent

UNITED STATES PATENTS

| | | |
|---|---|---|
| 2,066,075 | Reppe | Dec. 29, 1936 |
| 2,276,094 | Rothrock | Mar. 10, 1942 |
| 2,443,740 | Kropa | June 22, 1948 |
| 2,469,154 | Bunnell et al. | May 3, 1949 |
| 2,587,295 | Doyle et al. | Feb. 26, 1952 |
| 2,605,243 | Sowa | July 29, 1952 |
| 2,718,507 | Rauner | Sept. 20, 1955 |
| 2,804,439 | Drechsel | Aug. 27, 1957 |

OTHER REFERENCES

Peterson: Official Digest, Federation of Paint and Varnish Clubs, pages 596–600, August 1948. (Copy in Scientific Libr.).

UNITED STATES PATENT OFFICE
CERTIFICATE OF CORRECTION

July 14, 1959

Patent No. 2,894,922

Melvin M. Olson et al.

It is hereby certified that error appears in the printed specification of the above numbered patent requiring correction and that the said Letters Patent should read as corrected below.

Column 2, lines 37 and 38, equation (a), the lower right-hand portion should appear as shown below instead of as in the patent:

, or isomers, or column 3, line 70, for "here" read -- where --; column 5, line 70, for "flux" read -- reflux --.

Signed and sealed this 3rd day of May 1960.

(SEAL)
Attest:

KARL H. AXLINE
Attesting Officer

ROBERT C. WATSON
Commissioner of Patents